(12) United States Patent
Rubinstein et al.

(10) Patent No.: US 11,995,298 B1
(45) Date of Patent: May 28, 2024

(54) METHOD TO IDENTIFY A POINT INTENDED TO BE SELECTED ON A TOUCH SCREEN

(71) Applicant: PARALLELS INTERNATIONAL GmbH, Schaffhausen (CH)

(72) Inventors: Serge Rubinstein, Tallinn (EE); Ruslan Sadovnikov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 17/409,571

(22) Filed: Aug. 23, 2021

Related U.S. Application Data

(63) Continuation of application No. 16/174,129, filed on Oct. 29, 2018, now abandoned.

(51) Int. Cl.
| | |
|---|---|
| *G06F 3/04842* | (2022.01) |
| *G06F 3/041* | (2006.01) |
| *G06F 3/04817* | (2022.01) |
| *G06F 3/0488* | (2022.01) |
| *G06F 9/451* | (2018.01) |
| *G06N 3/045* | (2023.01) |
| *G06N 3/08* | (2023.01) |

(52) U.S. Cl.
CPC ........ *G06F 3/04842* (2013.01); *G06F 3/0418* (2013.01); *G06F 3/0488* (2013.01); *G06F 9/451* (2018.02); *G06N 3/045* (2023.01); *G06N 3/08* (2013.01); *G06F 3/04817* (2013.01)

(58) Field of Classification Search
CPC .. G06F 3/04842; G06F 3/0418; G06F 3/0488; G06F 9/451; G06F 3/04817; G06N 3/0454; G06N 3/08
See application file for complete search history.

(56) References Cited

U.S. PATENT DOCUMENTS

| | | |
|---|---|---|
| 2009/0213134 A1 | 8/2009 | Stephanick et al. |
| 2014/0289639 A1 | 9/2014 | Halim et al. |
| 2015/0130844 A1 | 5/2015 | Mistry |
| 2015/0163281 A1 | 6/2015 | Liu et al. |
| 2016/0188181 A1 | 6/2016 | Smith |
| 2017/0094019 A1 | 3/2017 | Ahmed et al. |
| 2017/0330336 A1 | 11/2017 | Roblek et al. |
| 2017/0371486 A1 | 12/2017 | Neiswander et al. |
| 2018/0039608 A1 | 2/2018 | Sharifi et al. |
| 2018/0210710 A1 | 7/2018 | Roman et al. |
| 2018/0349730 A1* | 12/2018 | Dixon .................. G06F 3/0486 |
| 2019/0065033 A1 | 2/2019 | Kulkarmi et al. |
| 2019/0310756 A1 | 10/2019 | Vathauer et al. |

* cited by examiner

*Primary Examiner* — Kenny Nguyen
(74) *Attorney, Agent, or Firm* — Rosenberg, Klein & Lee

(57) ABSTRACT

The subject matter of this specification describes a method to identify a point intended to be selected by a user on a touch screen of a user device. The method includes receiving user input including location coordinates for the user input, generating a screenshot image pertaining to a graphical user interface (GUI), determining intended location coordinates for a point intended to be selected in the GUI based on a detected layout of a GUI area corresponding to the user input, and providing, to the application, the determined intended location coordinates for the point intended to be selected in the GUI.

4 Claims, 6 Drawing Sheets

215

Provide a Screenshot Image Pertaining to the GUI as Input for the First Machine-Learning Model
405

Obtain an Output of the First Machine-Learning Model, where the Output Defines a Pixel Map of One or More Selectable and Non-Selectable Areas within the Screenshot Image
410

Calculate a set of Euclidean Distance Values between Coordinates for a Center Location in the Screenshot Image and Coordinates for Each of Selectable Pixels within the Pixel Map
415

Determine the Point, which the User Likely Intended to Select, as a Nearest Selectable Pixel to the Center Location within the Pixel Map based on the Set of Euclidean Distance Values
420

Provide a Screenshot Image Pertaining to the GUI as Input for the First Machine-Learning Model
405

Obtain an Output of the First Machine-Learning Model, where the Output Defines a Pixel Map of One or More Selectable and Non-Selectable Areas within the Screenshot Image
410

Provide the Pixel Map as Input for a Second Machine-Learning Model
425

Obtain Output of the Second Machine Learning Model, the Output of the Second Machine Learning Model Comprising Location Coordinates for the Point Which a User Likely Intended to Select
430

FIG. 4B

METHOD TO IDENTIFY A POINT INTENDED TO BE SELECTED ON A TOUCH SCREEN

TECHNICAL FIELD

This disclosure generally relates to systems and methods for predicting a point intended to be selected by a user on a touch screen of a user device.

BACKGROUND

Many modern mobile devices employ a variety of touch screens to display graphical user interfaces to users. Mobile devices, such as mobile phones and tablets, present challenges with regard to users touching the touch screen to select and activate a desired function within a graphical user interface of an application. Specifically, mobile device display screens may be limited in size and graphical user interfaces for applications may display numerous activation icons per square inch of the screen. The activation icons for the application may appear quite small on the mobile device display screen. As a result, users may unintentionally select an incorrect icon, which may result in activation of the wrong application or function.

DESCRIPTION OF DRAWINGS

FIG. 4A depicts a flow diagram of an example method for determining coordinates of a point intended to be selected by the user using a first machine learning model, in accordance with one or more implementations of the present disclosure.

FIG. 4B depicts a flow diagram of an example method for determining coordinates of a point intended to be selected by the user using a first machine learning model and a second machine learning model, in accordance with one or more implementations of the present disclosure.

DETAILED DESCRIPTION

Figure 1:
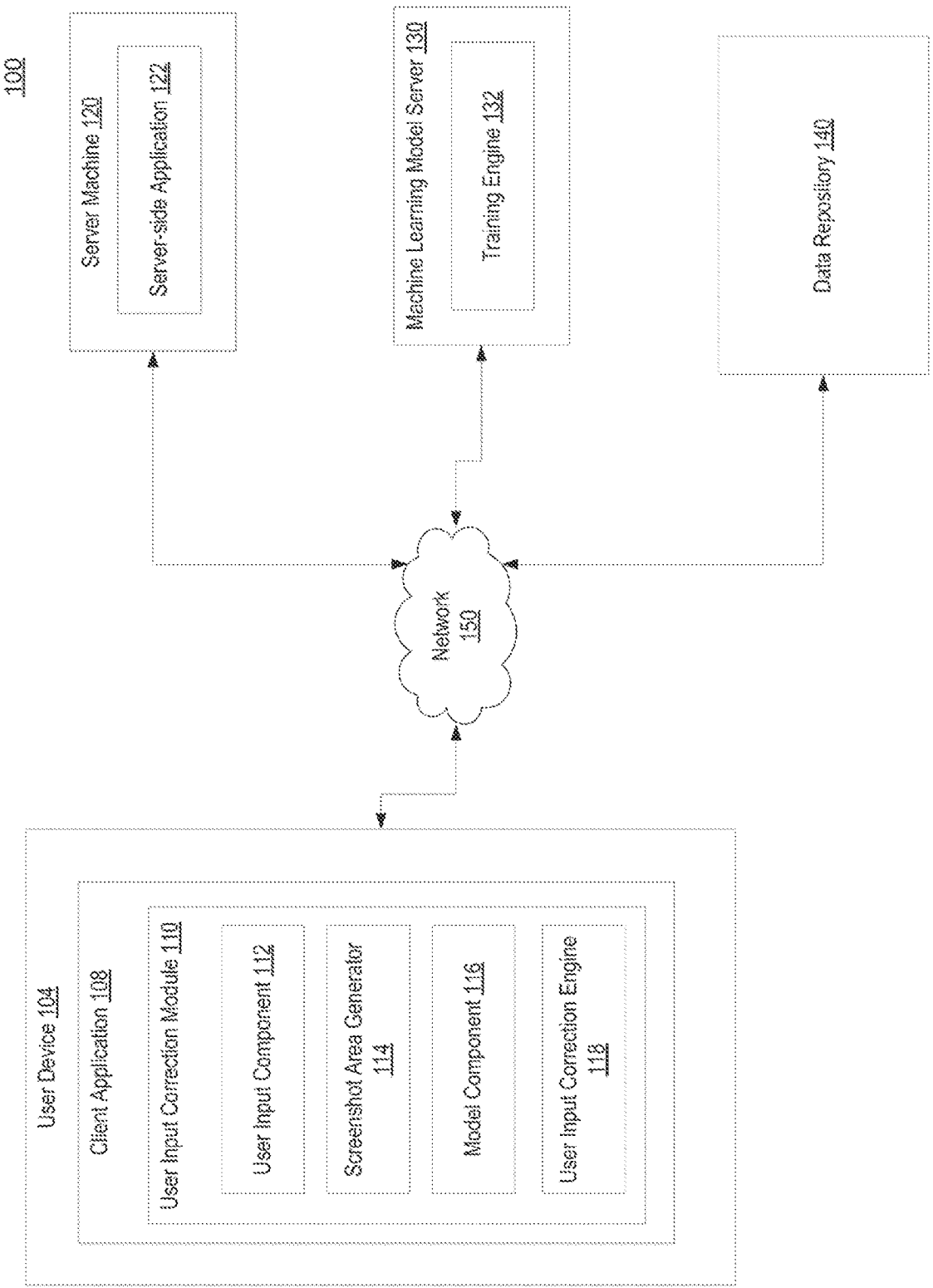
FIG. 1 illustrates schematically an exemplary high-level component diagram of a network architecture in which the methods and systems described herein may be implemented.

In a network environment it is often advantageous to employ a client-server application model where an application may include a client-side component that provides users with a user interface on a user device to initiate requests for and/or services of a server-side component. The server-side component may be configured to provide functions and services to one or more client-side components. In some instances, the client-side component may represent a lightweight component that presents a graphical user interface (GUI) to users who may request various actions by selecting one or more user interface (UI) controls from the client-side GUI. The client-side GUI may receive user input and send the selected user input to the server-side component for initiating a request and/or service.

Many client-side components may be implemented on client devices such as smart phones and tablets with touch screen displays. Users may interact with the GUI of the client-side component by tapping on the touch screen. However, due to the limited size of most touch screen displays on smart phones and tablets, users may erroneously select an incorrect icon, which may result in activation of an unintended service or function associated with the incorrect icon. The client-side component may send the user input corresponding to the unintended function request to the server-side component, which may result in unnecessary network traffic and wasted processing resources executing a function or service not intended to be executed by the user.

Conventional solutions may try to mitigate the problem of incorrect user input by employing a screen lens on the client-side component of the user device. A screen lens may represent a feature that selectively zooms in on a portion of the GUI display on the user device such that a user may be able to view an enlarged portion of the GUI display in order to accurately select the intended icon. However, employing screen lens functionality may result in the user having to unnecessarily scroll the enlarged GUI in order to find the desired icon or the user may have to provide one or more additional user taps in order to enable and/or disable the screen lens when interacting with the GUI. As a result, screen lens functionality may reduce erroneous user input by enlarging the GUI display but may require additional input from the user in order to enable the screen lens prior to selecting a desired icon and/or additional user scrolling operations to locate the desired icon on the screen. Thus, input to enable the screen lens may reduce a user's productivity, as the user will spend extra time and effort enabling/disabling the screen lens to perform tasks.

Other solutions may include employing server-side tap assistance functionality that may reduce erroneous user input by predicting intended user taps based on application specific metadata extracted from application programming interfaces (APIs). However, server-side tap assistance functionality may be dependent on compatible applications to provide APIs for extracting the metadata to determine the locations of selectable areas of UI controls (such as buttons) within the application's GUI. If an application implements custom functionality or does not provide necessary APIs, server-side tap assistance functionality may not be able to identify locations of selectable areas within the application's GUI. Additionally, user devices may implement client-side components that may not have corresponding server-side component functionality to extract metadata for determining the UI button locations. For example, if a user device is running a local operating system-based remote desktop protocol, then the server-side component that receives requests from the user device may not have a compatible server-side agent configured to perform the necessary metadata extraction. As a result, server-side tap assistance functionality may be dependent on application specific APIs that may not be available on many client-server applications or client-side deployments.

Aspects of the present disclosure address the above and other deficiencies by identifying a point intended to be selected by a user on a touch screen of the user device without the use of application specific metadata or APIs. In particular, aspects of the present disclosure identify a point intended to be selected by a user within a GUI using a screenshot of the GUI on the user device at the time the user selection is received. The user input location coordinates and the captured screenshot of the GUI may be used as input for determining the point, which the user likely intended to select in the GUI, using one or more machine learning models. The one or more machine learning models may be trained to predict selectable and non-selectable areas within a current GUI using previous screenshots and layout information of the same GUI and/or other GUIs with previously identified selectable and non-selectable areas. The one or more machine learning models may then be used to determine the point the user likely intended to select in the GUI based on the predicted map of selectable and non-selectable areas within the GUI and the user input location coordinates. The coordinates of the determined point may then be transmitted to the server-side component. By determining a point intended to be selected by the user, erroneous user inputs may be minimized, thereby reducing wasted processing and network resources used to process unintended locations of user selections.

When a user device receives user input on a touch screen, the user input typically is received over an area of multiple pixels. This may occur because when a user taps on a touch screen the user may use his/her finger to initiate the user input. A person's finger is generally larger than a single pixel and therefore the touch screen may receive input signals indicating multiple pixels that have been touched. The user device then needs to select a single pixel from the multiple pixels to represent the user input. However, ensuring that the selected single pixel actually represents the intended user's input remains a challenge. Additionally, touch screens on user devices may have a number of selectable icons per square inch. That is, when a user touches the touch screen, their finger may actually activate multiple selectable icons. Most touch screen enabled user devices may be configured to select whichever selectable icon is at the center of the area of the received user input. For example, if a user tapped the touch screen and the user's finger touched an area that covered two selectable icons, the selectable icon that is at the center of the area selected would likely be activated. If neither icon was at the center point, then the user device may not trigger any selectable icon. Therefore, there is a need to predict which icon or pixel within the user input area was actually intended to be activated by the user.

In an implementation, the user device may be configured to determine an area corresponding to the location of the user input received. For example, the user device may identify a tap location on the touchscreen where the user tapped his/her finger. The user device may be configured to determine a user input area that includes the tap location for the user's finger plus surrounding pixels that represent a margin of error. The user input area may represent a circular area with a radius equal to the user's fingerprint size plus the margin. In other embodiments, the user input area may represent a rectangular area for which the dimensions are based upon the user's fingerprint size. By using the user's fingerprint size to define the size of the user input area, the client device may be able to more accurately predict icons intended to be selected by the user regardless of whether the user has a large or small finger.

As described above, the user device may implement one or more machine learning models to accurately predict the location intended to be selected by the user based upon a screenshot of the GUI at the time the user input was received. In an embodiment, the user device may be configured to capture a screenshot of the GUI display at the time the user provided the user input. For example, the client device may capture the current GUI display at the time the user taps on the touch screen. The user device may then be configured to identify a portion of the screenshot that represents the user input area selected by the user input. The user device may generate a screenshot image representing the user input area that is defined as described above. In an implementation, the screenshot image may be a cropped portion of the captured screenshot of the entire GUI. In another implementation, the screenshot image may be an image that includes the entire screenshot of the GUI. For example, the screenshot image may be an image that includes the entire screenshot of the GUI and extra pixels surrounding portions of the screenshot of the GUI such that the center point of the screenshot image corresponds to the coordinates of the user input. The screenshot image of the user input area may then be provided to the one or more machine learning models to determine a point that was intended to be selected by the user input.

In an implementation, a first machine learning model may implement a convolutional neural network for efficient image recognition. A convolutional neural network is a neural network architecture that may include several convolutional layers and subsampling layers that apply filters to portions of the image to detect certain features, such as selectable and non-selectable areas of GUI. The convolutional neural network may include convolutional operations that multiply each image fragment by filters (e.g., matrices) element-by-element and sum the results in a similar position in an output image.

In an implementation, the first machine learning model may be trained to identify selectable and non-selectable areas within a screenshot of a GUI using a training set of GUI screenshots that include layout information with previously identified selectable and non-selectable areas. For example, the training set of GUI screenshots may include markup metadata that defines each pixel within a screenshot as either selectable or non-selectable. The training set of GUI screenshots may include several different screenshots for various applications. The training set of GUI screenshots is used to train the machine learning model to recognize, based upon visual features of a pixel and its surrounding pixels, whether or not the pixel is a selectable or a non-selectable pixel. Once trained, the machine learning model may receive as input, an area or portion of a screenshot that represents the location of where the user tapped on the touch screen and may generate as output a pixel map of pixels for the screenshot image of the user input area. Each of the pixels within the pixel map may be annotated as either selectable or non-selectable.

In an implementation, the first machine learning model may be further trained to annotate each pixel within the output pixel map with UI control types that define the particular selectable area that is represented by the pixel within the pixel map. For instance, if the screenshot image of the user input area included a checkbox, then the machine learning model may output a pixel map of the screenshot image that includes annotations defining which pixels are selectable and non-selectable, as well as identifiers that identify which pixels make up the checkbox UI control. Training of the first machine learning model to provide UI control types for selectable pixels within the output pixel map may include providing a training set of GUI screenshots that includes selectable pixels and associated UI control types for the selectable pixels within the GUI screenshots.

The user device, upon receiving from the first machine learning model the pixel map of the screenshot image, may then determine the point the user likely intended to select. In one implementation, the user device may identify the point the user likely intended to select by evaluating each pixel, within the output pixel map, that has been annotated as a selectable pixel. For example, Euclidean distance values may be calculated for each selectable pixel as the distance between the center point of the screenshot image and each respective selectable pixel. The center point of the screenshot image may be used to represent the center location of the fingerprint area of the user input received on the touch screen. A set of Euclidean distance values may be calculated for the selectable pixels within the pixel map. Using the calculated set of Euclidean distance values, the user device may be configured to identify the nearest selectable pixel to the center of the cropped screenshot image of the user input. The nearest selectable pixel may be used as an intended point of user selection.

In another implementation, the point the user likely intended to select may be determined using a second machine learning model configured to predict the coordinates of an intended user selection using, as input, the outputted pixel map from the first machine learning model. The second machine learning model may implement a convolutional neural network with dense layers. A convolutional neural network with dense layers may be implemented to classify features extracted from a convolutional neural network model. In a dense layer, every node in a layer is connected to every node in the preceding layer. That is, the second machine learning model may be trained using the first machine learning model in order to further classify pixel coordinates mapped by the first machine learning model. The second machine learning model may be configured to accept the pixel map from the first machine learning model as input and generate location coordinates for a point which the user likely intended to select.

In an implementation, the second machine learning model may be trained using sequences of screenshot frames that capture user input and subsequent user corrections. For example, if a user selected a particular area on the touch screen and then reselected a different area as a corrected selection, then the sequence of screenshot images may include the erroneous selection and the subsequent corrected selection. In an implementation, training of the second machine learning model may be implemented as a Recurrent Neural Network (RNN) with convolutional and dense layers. An RNN may include functionality to process information sequences and store information about previous computations in the context of a hidden layer. That is the RNN may have memory to keep and analyze information about previous and subsequent user input on a GUI in order to predict intended user input based upon sequences of incorrect and corrected inputs.

Accordingly, aspects of the present disclosure provide advantages of reducing network traffic between user devices and server machines by reducing requests of erroneous selections of unintended icons by the user. Reducing requests of erroneous selections saves processing resources on user devices and server machines by eliminating processes assigned to completing the erroneous requests. Processing resources and network bandwidth may be freed up to complete tasks related to intended requests by users. As a result, the system may benefit from more efficient utilization of resources by eliminating generation and processing of unintended requests.

FIG. 1 illustrates schematically an exemplary high-level component diagram of a network architecture in which the methods and systems described herein may be implemented. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity. Various other computer systems, software or hardware components, and/or methods of their interconnection, which are not shown in FIG. 1, may be compatible with the methods and systems described herein. The systems and methods described herein may be implemented by hardware (e.g., general purpose and/or specialized processing devices, and/or other devices and associated circuitry), software (e.g., instructions executable by a processing device), or a combination thereof. Various aspects of the above referenced disclosure are described in detail below by way of examples, rather than by way of limitation.

System architecture 100 may comprise of user device 104, server machine 120, machine learning model server 130, and data repository 140 connected to network 150. Network 150 can be Internet, local area network (LAN), wide area network (WAN), or a telecommunications network.

In the description below, the singular terms, such as "user device," "host," "server," "environment," etc. will be understood to also correspond to plural terms, whenever more than one device or component can possibly be used. The user device 104 may include one or more central processing units (CPU), not explicitly shown on FIG. 1, also referred to as "processing devices," communicatively coupled to one or more memory devices and one or more peripheral devices via buses (not shown). "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor, which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices, such as flash memory cards, compact disks, HDDs, or SSDs.

The user device 104 may be a smartphone, a tablet computer, a laptop with a touchscreen, or any other computing device configured to receive input from a touchscreen. The user device 104 may host a client application 108. The client application 108 may receive input from a user and may include a user input correction module 110 that determines whether the location of the user input is to be adjusted to represent the intended user input. The user input correction module 110 may contain a user input component 112, a screenshot area generator 114, a model component 116, and a user input correction engine 118. The user input component 112 may be configured to translate user input received via a touch screen on the user device 104 into a set of coordinates that represent a location of the user input on the touch screen. In one example, the user input component 112 may generate a set of XY coordinates for pixels on the touch screen that represent where the user tapped on the touch screen.

In an embodiment, the screenshot area generator 114 may be configured to capture a screenshot of the current GUI display on the touchscreen at the time the user input is received. For example, if the user device 104 displays a series of selectable icons on the touchscreen and receives user input selecting one of the icons, then the screenshot area generator 114 may capture a screenshot of the GUI displayed at the moment the user input is received. The screenshot area generator 114 may be further configured to generate a screenshot image of an area corresponding to the received user input by using the captured screenshot of the GUI or by cropping the captured screenshot of the GUI. For example, the screenshot image of the area corresponding to the received user input may be a cropped rectangular area with dimensions corresponding to the user's fingerprint. The rectangular area may represent an average sized fingerprint of a user. In other examples, the rectangular area may be configured to represent a fingerprint size that is proportional to the user. If a user has large fingers, then the screenshot area generator 114 may be configured to crop the rectangular area with larger dimensions proportional to the user's fingerprint size. In another embodiment, the screenshot area generator 114 may capture a square shaped cropped screenshot image of the area corresponding to the received user input.

The model component 116 may be configured to implement one or more machine learning models to determine a point intended to be selected by the user. In an embodiment, the model component 116 may use a first machine learning model that has been trained to identify selectable and non-selectable areas within a screenshot of a GUI. The first machine learning model may be trained on machine learning model server 130 (e.g., by training engine 132). A trained first machine learning model may be transmitted to the user device 104 when the client application 108 is installed or during an application update of the client application 108. In an embodiment, a dedicated update server (not shown) may be used to transmit the first machine learning model to the user device 104, where it can be stored locally. The model component 116 may receive from the screenshot area generator 114 the screenshot image of the area corresponding to the received user input and use the screenshot image of the area as input for the first machine learning model. As described, the first machine learning model may generate as output a pixel map of selectable and non-selectable pixels within the screenshot image of the area. The model component 116 may send the pixel map to the user input correction engine 118 to determine coordinates for a point intended to be selected by the user.

The user input correction engine 118 may determine coordinates of a point intended to be selected based upon the pixel map of selectable and non-selectable pixels received from the first machine learning model of the model component 116. In an embodiment, the user input correction engine 118 may use coordinates of a center point of the screenshot image of the area, which represents the user input received. The user input correction engine 118 may determine distance values between the center coordinates of the screenshot image and identified selectable pixels within the screenshot image. The user input correction engine 118 may then calculate a set of Euclidean distance values between the center coordinates and pixel coordinates corresponding to selectable pixels within the screenshot image of the area. Using the calculated set of Euclidean distance values, the user input correction engine 118 may identify the selectable pixel that is the nearest to the center coordinates. The nearest selectable pixel may represent the point that was intended to be selected by the user input.

In another embodiment, the second machine learning model is used to determine a point intended to be selected by the user. The second machine learning model may be trained (e.g., by training engine 132 on the machine learning model server 130) to output a prediction of location coordinates for a point intended to be selected by the user. The second machine learning model may be configured to receive as input the pixel map of selectable and non-selectable areas within the screenshot image of the area. That is, in this alternative embodiment, the user input correction engine 118 does not perform the calculations and merely receives predicted coordinates for the point intended to be selected by the user from the second machine learning model of the model component 116.

In some embodiments, where the screenshot area happens to be so small that no selectable pixels are detected inside it, the user input correction engine 118 may send the coordinates corresponding to the original location of the user input to the server-side application 122.

In an embodiment, the client application 108 may represent a client-side component of a distributed application. For example, the client application 108 may be a remote desktop client, such as an HTML 5-enabled browser configured to display remote applications running on the server machine 120. In other examples, the client application 108 may be a stand-alone application configured to send user input received to a corresponding server application. The client application 108 may display the GUI on the touchscreen of the user device 104.

The machine learning model server 130 may be a rackmount server, a personal computer, a laptop computer, one or more servers in the cloud, or any combination of the above. The machine learning model server 130 may include a training engine 132. The training engine 132 may include instructions stored on one or more tangible, machine-readable media of the machine learning model server 130 and executable by one or more processing devices of the machine learning model server 130. The one or more machine learning models, including the described first and second machine learning models, may represent model artifacts created by the training engine 132 using training data that includes training inputs and corresponding target outputs (correct answers for respective training inputs). The training engine 132 may find patterns in the training data that map the training input to the target output and provide machine learning models that capture these discovered patterns. For example, the training engine 132 may use as input a set of GUI screenshots and corresponding target output as markup metadata defining whether each pixel within a GUI screenshot is selectable or non-selectable. Additionally, the target output metadata may include information defining the type of UI control associated with each pixel. For example, if a set of pixels correspond to a dropdown menu button, then the metadata information for the set of pixels may include pixels that are selectable and are associated with a dropdown menu UI control.

The training engine 132 may use as input a set of pixel maps of screenshot areas provided by the first machine learning model for the second machine learning model. Corresponding sequences of screenshot frames that capture user input and subsequent user corrections may be used as target output for the second machine learning model. Once trained, the training engine 132 may provide the machine learning models to the model component 116 of the user device 104.

The server machine 120 may be a rackmount server, a personal computer, a laptop computer, one or more servers in the cloud, or any combination of the above. The server machine may include a server-side application 122 that represents a server-side component of a distributed application or a stand-alone server application configured to interact with a client application by sending and receiving communication to and from the corresponding client application. For example, the server-side application 122 may include a virtual execution environment, including but not limited to, Remote Desktop Services, virtual desktop infrastructures, containerization engines, or virtual execution environments provided by HTML5-enabled browsers.

The data repository 140 may represent persistent storage that is capable of storing cropped screenshot images and corresponding metadata information. The data repository 140 may be hosted by one or more storage devices, such as main memory, magnetic or optical storage based disks, tapes or hard drives, NAS, SAN, or any other storage medium. Although depicted as separate from the machine learning model server 130, in some implementations, the data repository 140 may be part of the machine learning model server 130. In some implementations, the data repository 140 may be a network-attached file server, while in other implementations the data repository 140 may be some other type of persistent storage such as an object-oriented database, a relational database, or any other storage format hosted by the machine learning model server 130 or one or more different machines attached to the network 150.

Figure 2:
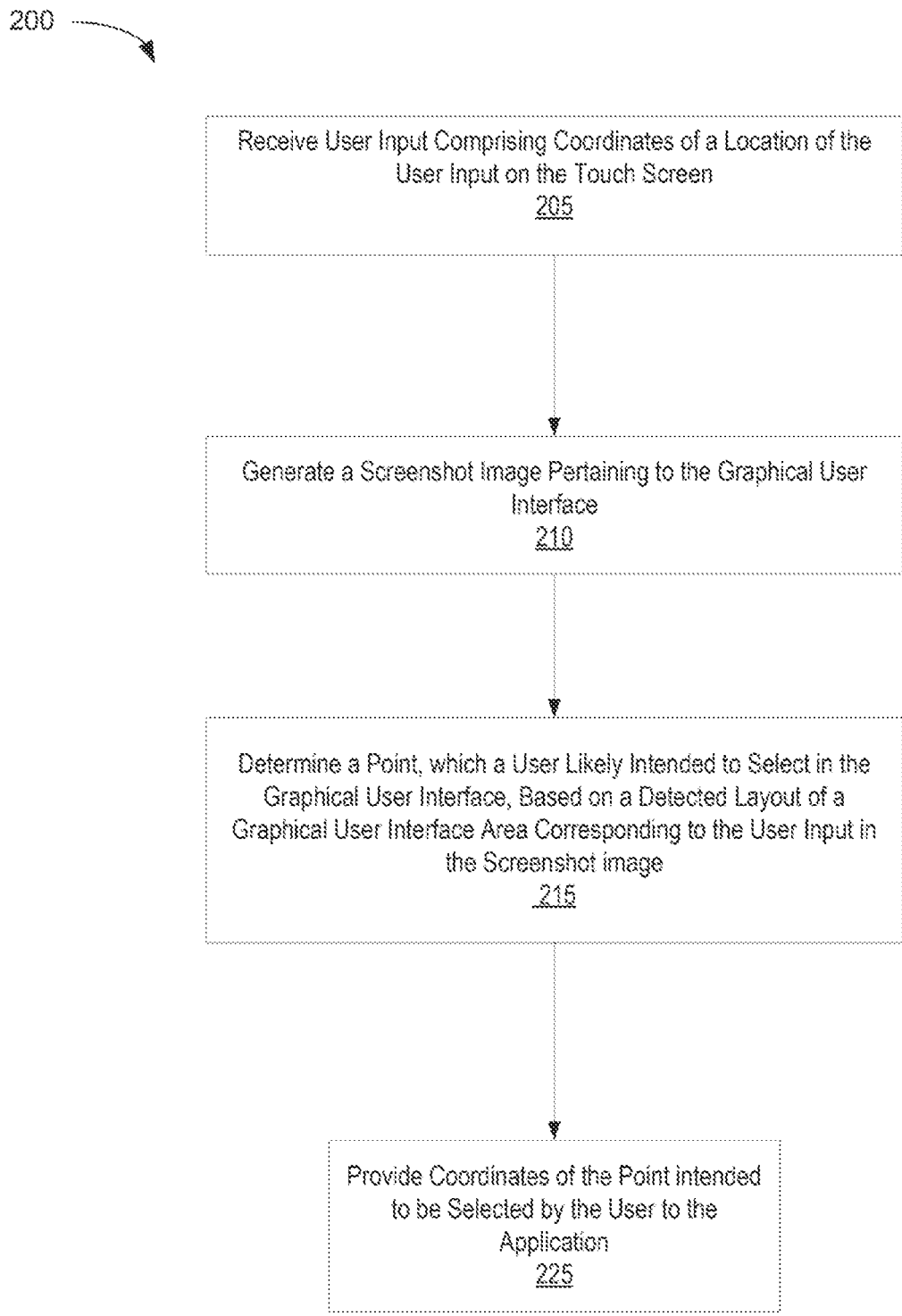
FIG. 2 depicts a flow diagram of an example method for identifying a point intended to be selected by a user on a touch screen of a user device, in accordance with one or more implementations of the present disclosure.

FIG. 2 depicts a flow diagram of an example method 200 for identifying a point intended to be selected by a user on a touch screen of a user device. Method 200 and/or each of its individual functions, routines, subroutines, or operations may be performed by one or more processing threads of the user device 104 implementing the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

Figure 3:
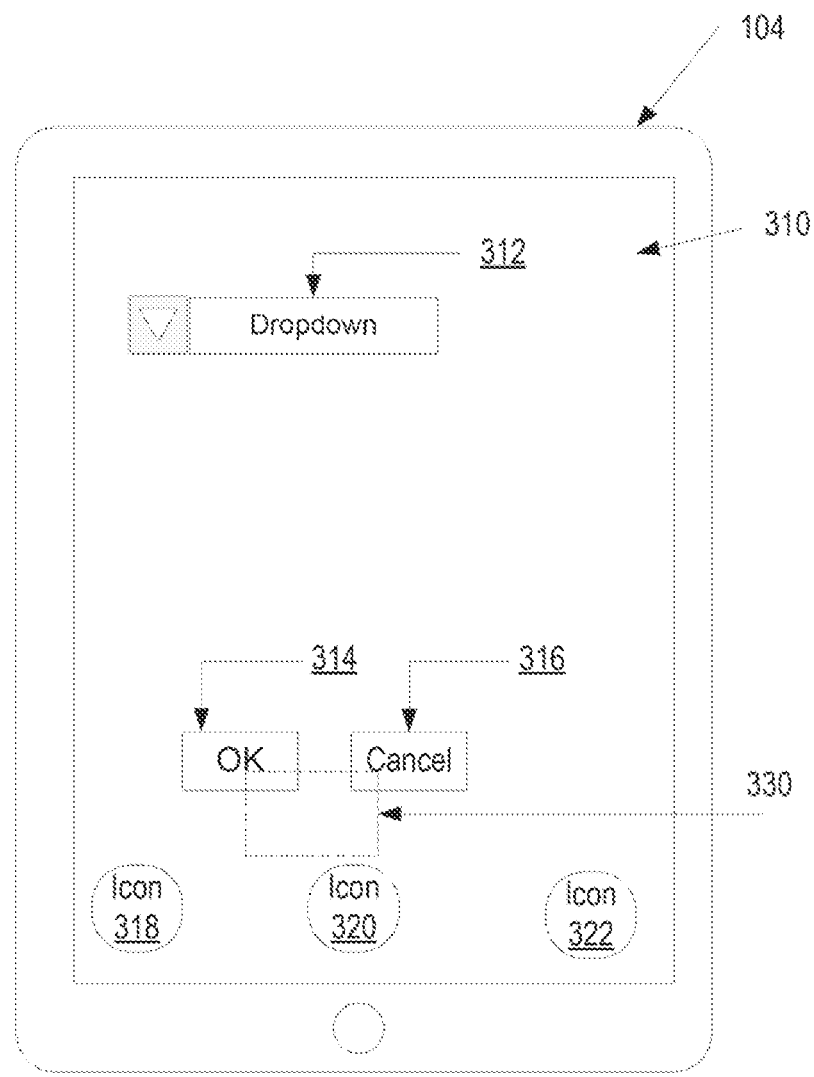
FIG. 3 depicts an example user device including a sample graphical user interface that the user may interact with to select various user interface controls displayed, in accordance with one or more implementations of the present disclosure.

FIG. 3 depicts an example user device 104 including a sample screenshot of a displayed GUI that the user may interact with in order to generate user input for selecting various UI controls displayed. GUI display 310 represents an example screenshot of a GUI on the user device 104 comprising various UI controls. The UI controls displayed on the GUI display 310 include dropdown menu 312, an OK button 314, a cancel button 316, and icons 318, 320, and 322.

Referring back to FIG. 2, at block 205, processing logic may receive user input on the touch screen of the user device 104. In an implementation, the user input component 112 may receive the user input on the touchscreen and may determine coordinates for the user input relative to the touch screen. For example, the user input component 112 may determine corresponding XY coordinates for pixels that represent the location where the user tapped on the touch screen.

At block 210, processing logic may generate a screenshot image pertaining to the GUI. In an implementation, the screenshot area generator 114 may capture the GUI displayed at the moment the user input is received (block 205). For example, the screenshot area generator 114 may capture a screenshot of the GUI 310 displayed at the moment the user taps on the touchscreen display.

The screenshot area generator 114 may use the captured screenshot as a screenshot image corresponding to the received user input. In another embodiment, the screenshot area generator 114 may crop the captured screenshot to generate the screenshot image of an area corresponding to the received user input. For instance, the screenshot area generator 114 may crop the GUI display 310 to generate a smaller cropped screenshot image of an area corresponding to the received user input (cropped screenshot image 330). Cropped screenshot image 330 may be represented as a rectangular screenshot area that may have dimensions equal to the user's fingerprint size plus additional area accounting for a margin of error. The margin of error may account for errors in estimating the fingerprint size. In other examples, not depicted in FIG. 3, the cropped screenshot image of the area generated by the screenshot area generator 114 may be shaped differently, such as a square, circle, or any other shape, and may be larger or smaller based on a larger or smaller fingerprint radius or a larger or smaller margin of error. Sizes of the fingerprint may be configured to be dependent on the user's finger size or the type of client application displayed. The margin of error may be configured to be dependent on user input history and identified misclicks on the client application.

At block 215, processing logic may determine a point, which the user likely intended to select in the GUI. Determination of the point may be based upon the screenshot image of the above area (generated at block 210) in the GUI and a plurality of other screenshot images of GUIs that each includes zero or more selectable areas and one or more non-selectable areas. In particular, as discussed above, in some implementations, the plurality of other screenshot images of GUIs may represent screenshot data used to train a first machine learning model, which is then able to predict selectable and/or non-selectable areas within a particular screenshot of the user GUI. That is, the first trained machine learning model can be applied to the screenshot image of the GUI area to determine a pixel map of selectable and non-selectable pixels within the cropped screenshot image of the GUI area.

At block 225, the processing logic provides the coordinates of the point intended to be selected by the user to the application.

In some implementations discussed in more detail with reference to FIG. 4A, distance values describing distances to the nearest selectable pixels in the pixel map may then be used to determine the point that the user intended to select. In alternative implementations discussed in more detail with reference to FIG. 4B, the pixel map may be used as input to a second machine learning model that has been trained to predict the point intended to be selected by the user in a particular GUI. As such, the second trained machine learning model may use the pixel map obtained from the first trained machine learning model to predict the point intended to be selected by the user in the GUI.

FIG. 4A depicts a flow diagram of an example method for predicting coordinates of a point intended to be selected by the user using the first machine learning model. At block 405, processing logic receives as input the screenshot image pertaining to the GUI. In an implementation, the model component 116 may implement the first trained machine learning model and may use the screenshot image as input for the first trained machine learning model. For example, referring to FIG. 3, the cropped screenshot image 330 may be received by the model component 116 as the screenshot image corresponding to the location of the user input in the GUI.

At block 410, processing logic obtains an output of the first machine learning model, where the output defines a pixel map of selectable and non-selectable areas within the screenshot image. In an implementation, the first trained machine learning model implemented by the model component 116 is used to generate output layout of the screenshot image that may be represented as a pixel map where each pixel is annotated as either a selectable pixel or a non-selectable pixel. For example, the first trained machine learning model may generate a pixel map corresponding to the pixels that make up the cropped screenshot image 330. In an implementation, the first trained machine learning model may further annotate each selectable pixel, within the pixel map, to include the UI control type associated with the corresponding pixel. For instance, the selectable pixels within the pixel map corresponding to cropped screenshot image 330 may be annotated to specify selectable pixels that correspond to a UI type "button." Additionally, the selectable pixels may be further annotated to specify that they correspond to a specific UI button, e.g., OK button 314 or Cancel button 316. In order for the first trained machine learning model to provide annotations of UI control types for selectable pixels, the first machine learning model may be previously trained using a training set of GUI screenshots that included selectable pixels and associated UI control types for the selectable pixels within the GUI screenshots.

At block 415, processing logic may calculate a set of Euclidean distance values between coordinates for the center location of the screenshot image and coordinates for each of the selectable pixels within the pixel map of the screenshot image. In an implementation, the user input correction engine 118 may receive, from the model component 116, the pixel map of selectable and non-selectable pixel areas within the screenshot image. The user input correction engine 118 may calculate the set of Euclidean distance values between center coordinates of the screenshot image and each of the selectable pixels within the screenshot image.

At block 420, processing logic may determine a point that was intended to be selected by the user, as the nearest selectable pixel to the center location within the pixel map based upon the set of Euclidean distance values. In an implementation, user input correction engine 118 may determine the nearest selectable pixel from the center location using the set of Euclidean distance values. The determined nearest selectable pixel may represent the point that was intended to be selected by the user input. Using the cropped screenshot image 330 as an example, the point may refer to a selectable pixel within the OK button 314.

In some implementations (not shown in the Figure), the pixel map provided by the first machine learning model may only consist of non-selectable pixels (i.e., may not include any selectable pixels). In such implementations, blocks 415 and 420 may not be performed and an indication is generated to specify that a valid intended point was not identified (e.g., by returning zero coordinates for the intended point).

As discussed above, according to alternative implementations, the model component 116 may predict the point intended to be selected by the user using the first machine learning model and the second machine learning model. FIG. 4B depicts a flow diagram of one illustrative example for predicting a point intended to be selected by the user using the first machine learning model and the second machine learning model. In an implementation, the first trained machine learning model may generate the pixel map of selectable and non-selectable pixels from the screenshot image, and then the second trained machine learning model may predict the point intended to be selected by the user using the pixel map from the first trained machine learning model as input.

In particular, FIG. 4B includes blocks 405 and 410, which are substantially similar to the corresponding blocks of FIG. 4A. At block 405, processing logic receives the screenshot image corresponding to the location of the user input. The model component 116 implements the first trained machine learning model and uses the screenshot image of the area as input for the first trained machine learning model. At block 410, processing logic obtains an output of the first trained machine learning model, where the output of the first machine learning model specifies a pixel map of selectable and non-selectable pixel areas of the screenshot image. The first trained machine learning model generates the output pixel map of the cropped screenshot image including pixels annotated as either selectable or non-selectable.

At block 425, processing logic provides the pixel map of selectable and non-selectable pixel areas (and the location of the user input) as input for the second trained machine learning model. As described previously, the second trained machine learning model may be previously trained based upon training data that includes as training input a set of pixel maps of screenshot areas with annotations for each selectable and non-selectable pixel. The training data may also include sequences of screenshot frames identifying user input, including erroneous input, and subsequent user correction input.

At block 430, processing logic obtains output of the second machine learning model. The output may comprise location coordinates for a point which the user likely intended to select. In an implementation, the model component 116 implements the second trained machine learning model that is configured to determine coordinates for the point intended to be selected by the user using the pixel map from the first trained machine learning model and the location of the user input. For example, the second trained machine learning model may determine a location for the point intended to be selected which may correspond to the OK button 314 that is within the cropped screenshot image 330. In some implementations, the output of the second trained machine learning model may include both the coordinates of the point intended to be selected and a probability that the user intended to select this point.

As discussed above, in some implementations (not shown in the Figure), the pixel map provided by the first machine learning model may only consist of non-selectable pixels (i.e., may not include any selectable pixels). In such implementations, the output of the second trained machine learning model may be the coordinates of the user input.

In an implementation, the user input correction engine 118 may send the coordinates of the determined point to the server-side application 122 on server machine 120. The server-side application 122 may receive the coordinates of the point and determine the corresponding user selection of a UI control based upon the coordinates. For instance, the coordinates of the point may refer to the OK button 314 within cropped screenshot image 330 and the user input correction engine 118 may send the coordinates of the point corresponding to a pixel within the OK button 314 to the server-side application 122. The server-side application 122 may receive the coordinates of the determined point and determine that the intended user input is to select the pixel of the UI control referring to the OK button 314. In another implementation, the client application 108 may receive the coordinates of the determined point, from the user input correction engine 118, and may determine the intended selectable pixel of the UI control associated with the coordinates of the point. The client application 118 may then send an identifier identifying the determined selectable pixel of the UI control to the server-side application 122.

Figure 5:
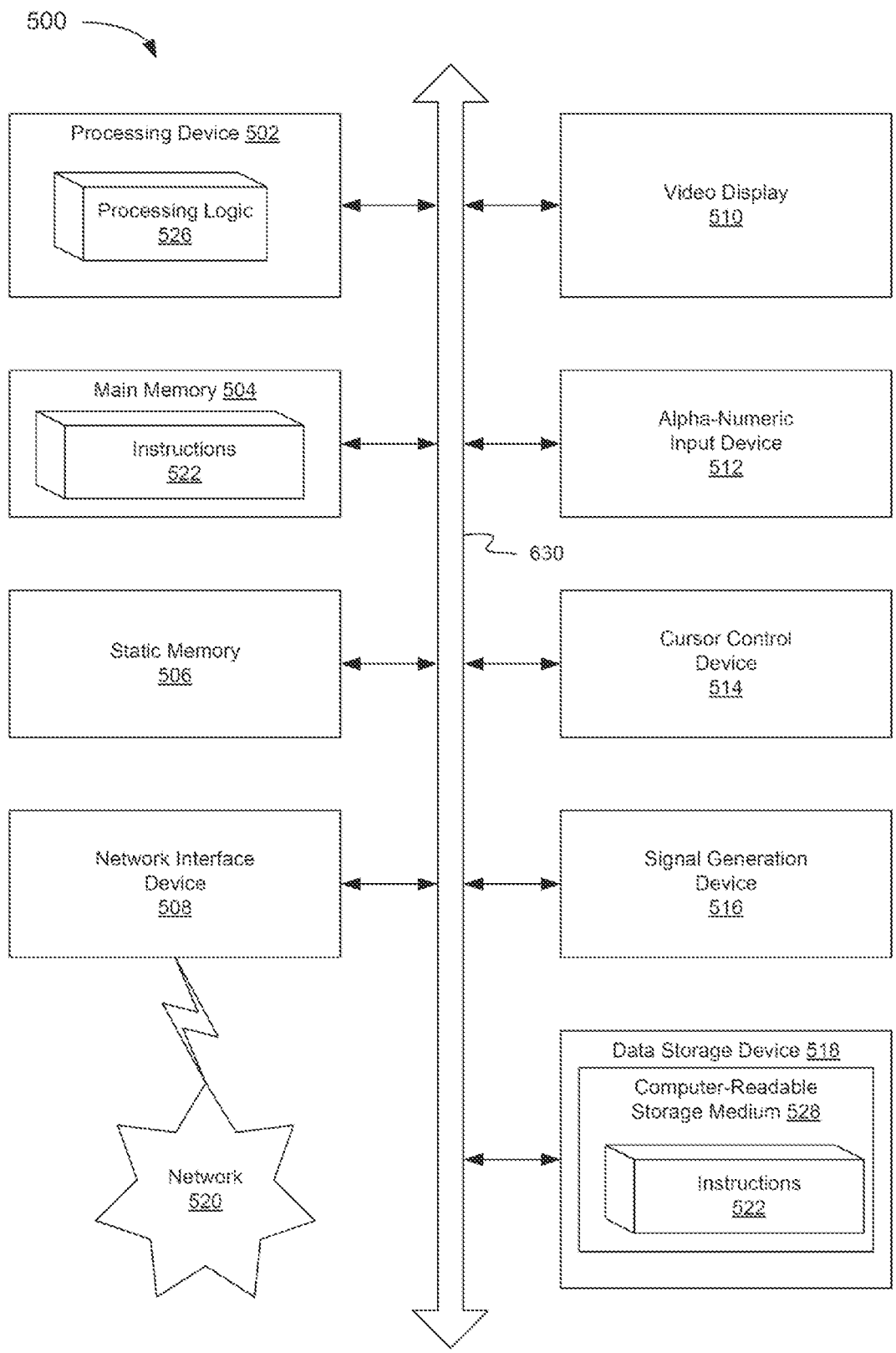
FIG. 5 depicts a block diagram of an example computer system operating in accordance with one or more aspects of the present disclosure.

FIG. 5 schematically illustrates a component diagram of an example computer system 500 which may perform any one or more of the methods described herein. In various illustrative examples, computer system 500 may represent the user device 104, the server machine 120, and/or the machine learning model server 130 of FIG. 1.

Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may comprise a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of initiating application execution in a client-server virtual execution environment, and/or method 500 of delivering application containers to the client device, and/or method 200 of periodic monitoring of remote server's performance.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or more specifically a non-transitory computer-readable storage medium) 528 on which is stored one or more sets of executable instructions 522. In accordance with one or more aspects of the present disclosure, executable instructions 522 may comprise executable instructions implement method 400 of initiating application execution in a client-server virtual execution environment, and/or method 500 of delivering application containers to the client device, and/or method 600 of periodic monitoring of remote server's performance.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    establishing upon a first device a trained first machine learning model where the trained first machine learning model was trained with a plurality of screenshot images and markup metadata for each screenshot image of the plurality of screenshot images where each screenshot image of the plurality of screenshot images comprises a pixel map of an area within a graphical user interface (GUI) of a plurality of GUIs and the markup metadata associated with a screenshot image of the plurality of screenshot images defines for each pixel within the screenshot image of the plurality of screenshots images whether the pixel is associated with a selectable element of the associated GUI of the plurality of GUIs or is a non-selectable portion of the associated GUI of the plurality of GUIs;
    providing to the trained first machine learning model a portion of a screenshot of a location where a user tapped a touch screen of a second device rendering an application GUI to the user where the trained first machine learning model determines for each pixel within the screenshot based upon visual features of the pixel and its surrounding pixels whether the pixel is a selectable pixel or a non-selectable pixel and generates as an output of the trained first machine learning model a pixel map of the screenshot of the location the user tapped the touch screen where each pixel in the pixel map is annotated as either selectable or non-selectable;
    determining based upon the pixel map output from the trained first machine learning model a point within the pixel map the user intended to select where the point is a pixel within the pixel map annotated as a selectable pixel;
    training a second machine learning model with a plurality of outputs from the trained first machine learning model and user corrections where each output of the plurality of outputs captures a user input where the point within the pixel map the user intended to select is established by an output of the trained second machine learning model being provided with the output pixel map of the screenshot of the location the user tapped the touch screen and where the trained second machine learning model outputs location coordinates for a point within the screenshot of the location where the user tapped the touch screen of the second device and a probability that the user intended to select the point within the pixel map;
    determining whether the point within the pixel map the user intended to select established by the output of the trained second machine learning model is associated with a selectable pixel;
    upon a negative determination that the point within the pixel map the user intended to select established by the output of the trained second machine learning model is associated with a selectable pixel sending an initially determined location of where the user tapped the touch screen of the second device to a server-side application; and
    upon a positive determination that the point within the pixel map the user intended to select established by the output of the trained second machine learning model is associated with a selectable pixel sending the determined point and the probability to the server-side application; wherein
    the screenshot of the location where the user tapped the touch screen has a predetermined geometry where the dimensions of the predetermined geometry are configured by the second device in dependence upon an application associated with the application GUI and include a margin of error; and
    the margin of error is established in dependence upon prior user input history and identified misclicks for the application associated with the application GUI.

2. The method according to claim 1, wherein
    the first machine learning model is further trained to annotate those pixels within the output pixel map associated with a selected element with a user interface control type defining a particular selectable area represented by the pixel within the output pixel map; and
    the training of the first machine learning model included providing the first machine learning model with another training set of GUI screenshots where each GUI screenshot of the set of GUI screenshots includes selectable pixels and associated UI control types for the selectable pixels within the GUI screenshot of the set of GUI screenshots.

3. A method comprising:
    establishing upon a first device a trained first machine learning model where the trained first machine learning model was trained with a plurality of screenshot images and markup metadata for each screenshot image of the plurality of screenshot images where each screenshot image of the plurality of screenshot images comprises a pixel map of an area within a graphical user interface (GUI) of a plurality of GUIs and the markup metadata associated with a screenshot image of the plurality of screenshot images defines for each pixel within the screenshot image of the plurality of screenshots images whether the pixel is associated with a selectable element of the associated GUI of the plurality of GUIs or is a non-selectable portion of the associated GUI of the plurality of GUIs;

providing to the trained first machine learning model a portion of a screenshot of a location where a user tapped a touch screen of a second device rendering an application GUI to the user where the trained first machine learning model determines for each pixel within the screenshot based upon visual features of the pixel and its surrounding pixels whether the pixel is a selectable pixel or a non-selectable pixel and generates as an output of the trained first machine learning model a pixel map of the screenshot of the location the user tapped the touch screen where each pixel in the pixel map is annotated as either selectable or non-selectable;

determining based upon the pixel map output from the trained first machine learning model a point within the pixel map the user intended to select where the point is a pixel within the pixel map annotated as a selectable pixel;

training a second machine learning model with a plurality of outputs from the trained first machine learning model and user corrections where each output of the plurality of outputs captures a user input where the point within the pixel map the user intended to select is established by an output of the trained second machine learning model being provided with the output pixel map of the screenshot of the location the user tapped the touch screen and where the trained second machine learning model outputs location coordinates for a point within the screenshot of the location where the user tapped the touch screen of the second device and a probability that the user intended to select the point within the pixel map;

determining whether the point within the pixel map the user intended to select established by the output of the trained second machine learning model is associated with a selectable pixel;

upon a negative determination that the point within the pixel map the user intended to select established by the output of the trained second machine learning model is associated with a selectable pixel sending an initially determined location of where the user tapped the touch screen of the second device to a server-side application; and upon a positive determination that the point within the pixel map the user intended to select established by the output of the trained second machine learning model is associated with a selectable pixel sending the determined point and the probability to the server-side application; wherein the screenshot of the location where the user tapped the touch screen has a predetermined geometry where the dimensions of the predetermined geometry are configured by the second device and include a margin of error; and the margin of error is established in dependence upon prior user input history and identified misclicks for an application associated with the application GUI.

4. A method comprising:

establishing upon a first device a trained first machine learning model where the trained first machine learning model was trained with a plurality of screenshot images and markup metadata for each screenshot image of the plurality of screenshot images where each screenshot image of the plurality of screenshot images comprises a pixel map of an area within a graphical user interface (GUI) of a plurality of GUIs and the markup metadata associated with a screenshot image of the plurality of screenshot images defines for each pixel within the screenshot image of the plurality of screenshots images whether the pixel is associated with a selectable element of the associated GUI of the plurality of GUIs or is a non-selectable portion of the associated GUI of the plurality of GUIs;

providing to the trained first machine learning model a portion of a screenshot of a location where a user tapped a touch screen of a second device rendering an application GUI to the user where the trained first machine learning model determines for each pixel within the screenshot based upon visual features of the pixel and its surrounding pixels whether the pixel is a selectable pixel or a non-selectable pixel and generates as an output of the trained first machine learning model a pixel map of the screenshot of the location the user tapped the touch screen where each pixel in the pixel map is annotated as either selectable or non-selectable;

training a second machine learning model with a plurality of outputs from the trained first machine learning model and user corrections where each output of the plurality of outputs captures a user input where a point within the pixel map the user intended to select is established by an output of the trained second machine learning model being provided with the output pixel map of the screenshot of the location the user tapped the touch screen and where the trained second machine learning model outputs location coordinates for a point within the screenshot of the location where the user tapped the touch screen of the second device and a probability that the user intended to select the point within the pixel map;

determining whether the point within the pixel map the user intended to select established by the output of the trained second machine learning model is associated with a selectable pixel;

upon a negative determination that the point within the pixel map the user intended to select established by the output of the trained second machine learning model is associated with a selectable pixel sending an initially determined location of where the user tapped the touch screen of the second device to a server-side application; and upon a positive determination that the point within the pixel map the user intended to select established by the output of the trained second machine learning model is associated with a selectable pixel sending the determined point and the probability to the server-side application; wherein the screenshot of the location where the user tapped the touch screen has a predetermined geometry where the dimensions of the predetermined geometry are configured by the second device and include a margin of error; and the margin of error is established in dependence upon prior user input history and identified misclicks for an application associated with the application GUI.

* * * * *